May 20, 1969     E. J. WHITNEY     3,445,024

FLEXIBLE SEALING RING

Filed March 14, 1968

INVENTOR.
Earl J. Whitney
BY
ATTORNEY ised

United States Patent Office 3,445,024
Patented May 20, 1969

3,445,024
FLEXIBLE SEALING RING
Earl J. Whitney, Corning, N.Y., assignor to Corning Glass Works, Corning, N.Y., a corporation of New York
Filed Mar. 14, 1968, Ser. No. 713,187
Int. Cl. B65d *53/02;* F16j *15/32, 13/02*
U.S. Cl. 215—40                                 5 Claims

ABSTRACT OF THE DISCLOSURE

A removable sealing ring of flexible material having a grooved portion backed by an air chamber to compensate for and effectively seal irregular rim surfaces of a glass container.

Background of the invention

In the past it has not been possible to obtain a quick-acting effective seal about the beaded edge of inexpensive glass storage containers similar to canister sets. With the more sophisticated and precision formed glass containers utilized in food packaging and canning, it is of course possible to obtain a good working seal with the use of small or compact sealing gaskets, due to the minimum manufacturing tolerances maintained between the cover member and the sealing edge. However, in the manufacture of inexpensive blown ware, it is customary to cut off an unsupported moil portion from the ware article by means of a flame cut, resulting in the obtainment of rather poor edge surface tolerances. With the present invention it is now possible to utilize existing glass manufacturing equipment to produce manually sealable storage containers, since the sealing ring construction compensates for manufacturing tolerances and effectively seals irregular rim surfaces of glass containers.

Summary of the invention

The present invention sets forth an easily removable snap-in gasket or sealing ring of flexible plastic material, which may be easily removed from a cover member for cleansing purposes. The ring is provided with a pair of raised concentric ridges on its front face which provide an annular sealing groove therebetween. The raised ridges and the sealing groove are spaced from a back supporting surface in such a manner so as to provide an annular air chamber or channel between an inner surface portion of a cover member and the back surface portion of the ridges and groove. The height of the air chamber and the flexible nature of the gasket material cooperate to provide a substantially uniform annular seal with an irregular bead edge of a glass container, as a cover member containing the same is forced downwardly over the open end of such container, such as by means of screw lugs.

It thus has been an object of the present invention to provide an improved flexible sealing ring which not only effectively seals irregular edge portions of a glass container, but which may be easily removable from and reinserted in a cover member to facilitate cleaning.

Description of the preferred embodiment

Figure 1:
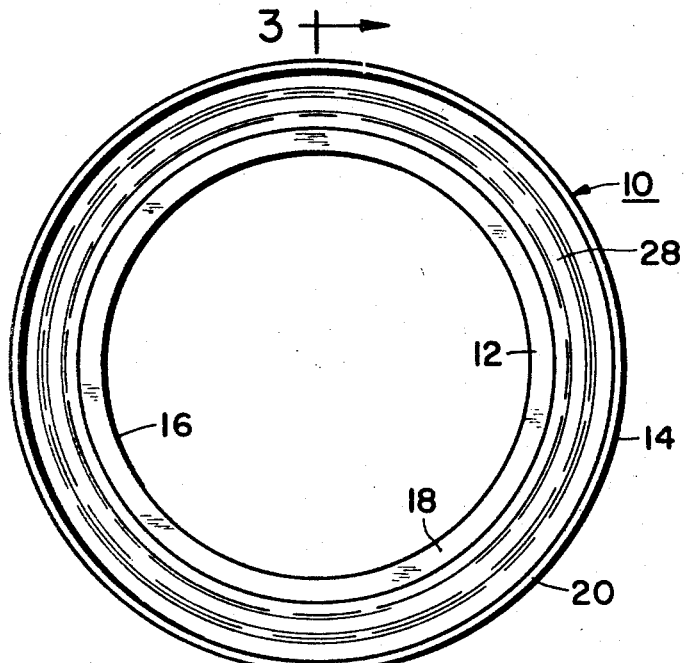
FIG. 1 is a back plan view of a flexible sealing ring embodying the present invention.
Figure 3:
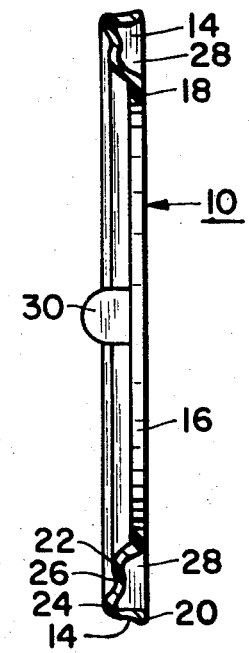
FIG. 3 is an elevational view in section taken along line 3—3 of FIG. 1.
Figure 2:
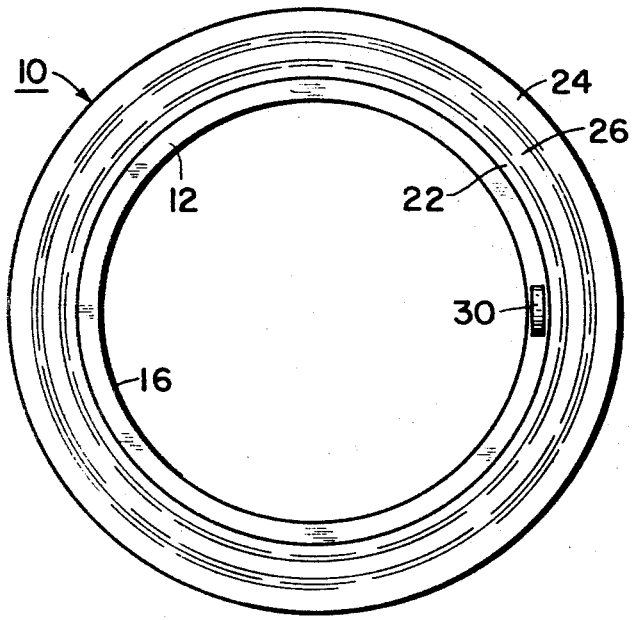
FIG. 2 is a front plan view of the sealing ring shown in FIG. 1.
Figure 4:
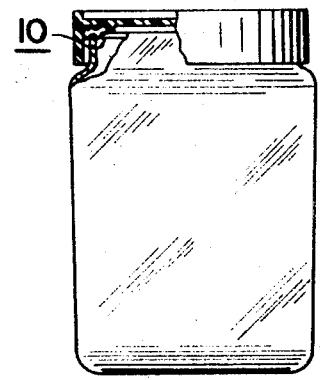
FIG. 4 is a partially cutaway view illustrating a ridged cover member retaining a sealing ring embodying the present invention positioned in sealing engagement with a beaded edge of a glass container.

Referring now to the drawings, a sealing ring or gasket 10 is shown having an inner peripheral rim portion 12 and an outer peripheral wall portion 14. The inner edge 16 of rim portion 12 is designed to cooperate with and frictionally engage a raised ridge on an under surface of a cover member, in order to retain the sealing ring in position within the cover. In addition, the inner peripheral rim portion 12 provides rigidity and support for the sealing ring 10, since the ring only engages the cover member along the annular back surface 18 of the rim portion 12 and annular back surface 20 of the outer peripheral wall portion 14.

The sealing ring is provided with an inner ridge 22 and an outer ridge 24 having an aligning or sealing groove 26 formed therebetween. The inner ridge 22 communicates with and rises outwardly from the front surface of the rim portion 12, whereas the outer ridge 24 forms the upper extent of outer wall portion 14. An annular passage or air channel 28 is formed rearwardly of the ridges 22 and 24 and the groove 26. A tab portion 30 is attached to the inner rim portion 12 so as to provide a means for easily removing the sealing ring 10 from a cover member, such as for cleansing purposes.

In operation, the sealing ring or gasket 10 is positioned within a cover member in such a manner so that the inner edge 16 frictionally engages a ridge portion extending downwardly from an inner surface of the cover member. In addition, the back surfaces 18 and 20 of the inner peripheral rim portion 12 and outer peripheral wall portion 14, respectively, lie within a substantially common plane so as to engage the inner surface of the cover member and support the inner and outer ridge portion 22, 24 in spaced relation with respect thereto. Accordingly, a substantially closed annular passage or air channel 28 is formed between the inner surface of the cover member and the back surfaces of the ridge and groove portions.

When the cover member is screwed downwardly onto a container, the upper edge of the container initially engages the alignment groove 26 causing the groove to depress within the air chamber 28, with the result that the outer ridge 24 will engage the outer edge of the bead about the top of the container, whereas the inner ridge 22 will engage the inner surface of such bead. In addition, it will be noted that the outer ridge 24 extends a greater height than inner ridge 22 so that when the cover is screwed onto the container, the ridge 24 will have a tendency to provide a sealing-wedging effect between the inner sidewalls of the cover member and the outer edge of the container bead. It thus can be seen that the combination of the flexible gasket material forming the ridges and groove together with the air channel, provides a virtually continuous effective seal for the beaded edge of a glass container which may have slight irregularities due to loose manufacturing tolerances.

The cover member is preferably made of a rigid plastic material such as styrene, whereas the container is preferably formed of a glass or glass-ceramic material. However, as previously stated, the sealing ring must possess flexible properties to provide a substantially continuous surface contact with an irregular container edge, so as to facilitate depression thereof into the annular air chamber or channel 28. In addition, the sealing ring material must meet with FDA approval, since the cover and container are intended for the storage of food stuffs. In addition, the material must withstand high temperatures such as are encountered in automatic dishwashers, without undergoing serious deformation. Therefore, it is preferred that the sealing ring be made of flexible plastic such as an ethylene-vinyl acetate copolymer resin, sold under the trademark Alathon 3170, by E. I. du Pont de Nemours & Co., Inc.

Although I have disclosed the now preferred embodiment of the invention, it will be apparent to those skilled in the art that various changes and modifications may be made thereto without departing from the spirit and scope of the invention as defined in the appended claims.

I claim:

1. In combination with a glass container having a beaded upper edge which may be slightly irregular and a cover member therefor having annular sidewall portions and an inner surface portion provided with a downwardly projecting annular ridge, a flexible sealing ring releasably positionable within said cover member comprising, an inner peripheral rim portion and an outer peripheral wall portion having annular back surface portions engaging the inner surface of said cover member, a front surface of said sealing ring having an inner annular ridge and an outer annular ridge forming a sealing groove therebetween, said inner annular ridge communicating with said inner peripheral rim portion and said outer annular ridge formed on said outer peripheral wall portion, an annular air channel formed between the inner surface of said cover member and the back surfaces of said ridges and groove, and said sealing ring being formed of a flexible material so that when said cover member is applied to said container any irregularities in the beaded upper surface of the container may readily depress the sealing groove within the air channel to compensate therefor and thus provide a virtually continuous seal about the upper edge of the container.

2. In the combination as defined in claim 1, said annular back surfaces lying within a substantially common plane in contact with the inner surface of said cover member so as to provide a substantially closed annular air passage between said inner cover surface and the back surfaces of said ridges and groove.

3. In the combination as defined in claim 1 said inner peripheral rim portion having an inner edge in frictional engagement with the downwardly projecting annular ridge on the inner surface of said cover member to releasably retain said sealing ring in position within said cover member.

4. In the combination defined in claim 1 tab means secured to said inner peripheral rim portion for facilitating the removal of said sealing ring from said cover member.

5. In the combination defined in claim 1 said sealing ring being formed of a flexible plastic material.

References Cited

UNITED STATES PATENTS 1,935,094    11/1933    Krause _____ 220—46
3,122,255    2/1964    Hagmann et al. _____ 215—40

FOREIGN PATENTS 887,480    1/1962    Great Britain.

JOSEPH R. LECLAIR, *Primary Examiner.*

U.S. Cl. X.R.

220—46; 277—205